United States Patent
Kim et al.

(10) Patent No.: US 9,578,563 B2
(45) Date of Patent: *Feb. 21, 2017

(54) METHOD AND APPARATUS FOR EFFECTIVELY CONTROLLING CELL RESELECTION PRIORITY OF USER EQUIPMENT IN CSG CELL

(71) Applicant: Samsung Electronics Co., Ltd., Suwon-si, Gyeonggi-do (KR)

(72) Inventors: Sangbum Kim, Seoul (KR); Soenghun Kim, Yongin-si (KR); Kyeongin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,368

(22) Filed: Aug. 29, 2016

(65) Prior Publication Data
US 2016/0366625 A1    Dec. 15, 2016

Related U.S. Application Data

(63) Continuation of application No. 13/443,199, filed on Apr. 10, 2012, now Pat. No. 9,432,927.
(Continued)

(51) Int. Cl.
*H04B 7/00* (2006.01)
*H04W 36/00* (2009.01)
(Continued)

(52) U.S. Cl.
CPC ......... *H04W 36/0083* (2013.01); *H04W 12/02* (2013.01); *H04W 36/04* (2013.01)

(58) Field of Classification Search
USPC ....................................................... 455/509
See application file for complete search history.

(56) References Cited

U.S. PATENT DOCUMENTS

2009/0238117 A1* 9/2009 Somasundaram ... H04J 11/0093
370/328
2010/0222055 A1* 9/2010 Cho ..................... H04J 11/0086
455/434
(Continued)

FOREIGN PATENT DOCUMENTS

CN    101742580 A    6/2010
CN    101801068 A    8/2010
(Continued)

OTHER PUBLICATIONS

"3rd Generation Partnership Project; Technical Specification Group Radio Access Network; Mobility procedures for Home Node B (HNB); Overall description; Stage 2 (Release 10)", 3GPP Standard; 3GPP TS 25.367, 3rd Generation Partnership Project (3GPP), Mobile Competence Centre ; 650, Route Des Lucioles ; F-06921 Sophia-Anti Polis Cedex; France, No. V10.0.0, Mar. 15, 2011, pp. 1-14, XP050476328.
(Continued)

*Primary Examiner* — Ankur Jain
(74) *Attorney, Agent, or Firm* — Jefferson IP Law, LLP

(57) ABSTRACT

A method by which a User Equipment (UE) controls a cell reselection priority in a Closed Subscriber Group (CSG) cell and an apparatus thereof are provided. The method of reselecting a cell by a UE in a mobile communication system includes receiving priority information about a cell reselection priority by frequencies transmitted from the mobile communication system, performing a cell reselection process according to the received priority information, determining whether a CSG cell to which the UE is allowed to connect is reselected, and assigning a highest cell reselection priority to a frequency for the CSG cell in reselecting the CSG cell.

8 Claims, 5 Drawing Sheets

Related U.S. Application Data

(60) Provisional application No. 61/473,966, filed on Apr. 11, 2011.

(51) Int. Cl.
  *H04W 12/02* (2009.01)
  *H04W 36/04* (2009.01)

(56) References Cited

U.S. PATENT DOCUMENTS

| | | | |
|---|---|---|---|
| 2010/0265918 A1* | 10/2010 | Marinier | H04W 36/20 370/332 |
| 2012/0135737 A1* | 5/2012 | Yoshihara | H04W 36/30 455/436 |
| 2015/0043533 A1* | 2/2015 | Kim | H04W 48/20 370/331 |

FOREIGN PATENT DOCUMENTS

| | | |
|---|---|---|
| CN | 101990184 A | 3/2011 |
| JP | 2011-516000 A | 5/2011 |
| JP | 2012-524501 A | 10/2012 |
| KR | 10-2009-0045039 A | 5/2009 |
| WO | 2010-044903 A2 | 4/2010 |
| WO | 2010-123876 A2 | 10/2010 |
| WO | 2011-004828 A1 | 1/2011 |

OTHER PUBLICATIONS

"Universal Mobile Telecommunications System (UMTS); User Equipment (UE) procedures in idle mode and procedures for cell reselection in connected mode (3GPP TS 25.304 version 9.4.0 Release 9)", Technical Specification, European Telecommunications Standards Institute (ETSI), 650, Route Des Lucioles ; F-06921 Sophia-Antipolis ; France, vol. 3GPP RAN 2, No. V9.4.0, Mar. 1, 2011, XP014064877.

Nokia et al: "E-Utra Cell Selection and Cell Reselection Aspects", 3GPP Draft; R2-074051 E-Utra Cell Reselections, 3rd Generation Partnership Project (3GPP). Mobile Competence Centre 650, Route Des Lucioles; F-06921 Sophia-Antipolis Cedex; France, vol. RAN WG2, No. Shanghai, China; Oct. 2, 2007, Oct. 2007, XP050136685.

Yingmin Wang, TD-LTE Technology Principle and System Design, Oct. 29, 2010.

\* cited by examiner

METHOD AND APPARATUS FOR EFFECTIVELY CONTROLLING CELL RESELECTION PRIORITY OF USER EQUIPMENT IN CSG CELL

CROSS-REFERENCE TO RELATED APPLICATIONS

This is a continuation application of a U.S. patent application filed on Apr. 10, 2012 in the U.S. Patent and Trademark Office and assigned Ser. No. 13/443,199, which issued as U.S. Pat. No. 9,432,927 on Aug. 30, 2016, which claims the benefit under 35 U.S.C. §119(e) of a U.S. provisional patent application filed on Apr. 11, 2011 in the U.S. Patent and Trademark Office and assigned Ser. No. 61/473,966, and under 35 U.S.C. §119(a) of a Korean patent application filed on Apr. 6, 2012 in the Korean Intellectual Property Office and assigned Serial No. 10-2012-0035969, the entire disclosure of each of which is hereby incorporated by reference.

BACKGROUND OF THE INVENTION

1. Field of the Invention

The present invention relates to a wireless communication system. More particularly, the present invention relates to a method by which a User Equipment (UE) controls a cell reselection priority in a Closed Subscriber Group (CSG) cell and an apparatus thereof.

2. Description of the Related Art

Generally, a mobile communication system has been developed with a goal of providing communication to a mobile user. The mobile communication system has evolved so as to provide a high-speed data communication service as well as a voice communication service.

Recently, Long Term Evolution (LTE), which is a next generation mobile communication system, has been standardized by the 3rd Generation Partnership Project (3GPP). LTE is a technology of realizing high-speed packet-based communication having a transmission rate of about a maximum of 100 Mbps. Various schemes for LTE are under discussion. For example, a scheme of reducing nodes located on communication paths by simplifying a network structure, a scheme of allowing a wireless protocol to be close to a wireless channel, etc.

Meanwhile, unlike a voice communication service, in a data communication service, resources and the like which are assigned according to the quantity of data and a channel state are determined. Thus, in a wireless communication system such as a mobile communication system, management of the assignment of transmission resources in consideration of the quantity of resources available for transmission, a channel state, the quantity of data and the like is performed by a scheduler. A similar function is performed in next generation LTE mobile communication systems. Also, a scheduler located at a base station manages and assigns wireless transmission resources.

Recently, an evolved LTE communication system, i.e., LTE-Advanced (LTE-A), which increases a transmission rate by applying several new technologies to an LTE communication system has been discussed. Research for Closed Subscriber Group (CSG) cell technology in the evolved LTE-A system has also been conducted. The CSG cell is a cell to which only a specific user is allowed to access. An example of a CSG cell is explained below with reference to FIG. 1.

FIG. 1 is a view illustrating a concept of a CSG cell according to the related art.

Referring to FIG. 1, there are two User Equipment (UEs) 110 and 115 in a service area 105 of a CSG cell. UE 110, as a member of the CSG cell, is connected to the CSG cell to perform communication. However, UE 115, as non-member of the CSG cell, is not connected to the CSG cell. Rather, the UE 115 is connected to evolved Node B (eNB) 100, which is a remote macro-cell base station, to perform communication. Each of UE 110 and 115 has a white-list describing whether the UE is a member of a specific CSG cell.

SUMMARY OF THE INVENTION

Aspects of the present invention are to address at least the above-mentioned problems and/or disadvantages and to provide at least the advantages described below. Accordingly, an aspect of the present invention is to provide a method which effectively controls a cell reselection priority of a User Equipment (UE) in a Closed Subscriber Group (CSG) cell and an apparatus thereof.

In accordance with an aspect of the present invention, a method of reselecting a cell by a UE in a mobile communication system is provided. The method includes receiving priority information about a cell reselection priority by frequencies transmitted from the mobile communication system, performing a cell reselection process according to the received priority information, determining whether a CSG cell to which the UE is allowed to connect is reselected, and assigning a highest cell reselection priority to a frequency for the CSG cell in reselecting the CSG cell.

In accordance with another aspect of the present invention, a UE for reselecting a cell in a mobile communication system is provided. The UE includes a transceiver for transmitting and receiving a signal or data to and from a base station, and a controller for receiving priority information about a cell reselection priority by frequencies transmitted from the mobile communication system, performing a cell reselection process according to the received priority information, determining whether a CSG cell to which the UE is allowed to connect is reselected, and assigning a highest cell reselection priority to a frequency for the CSG cell in reselecting the CSG cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
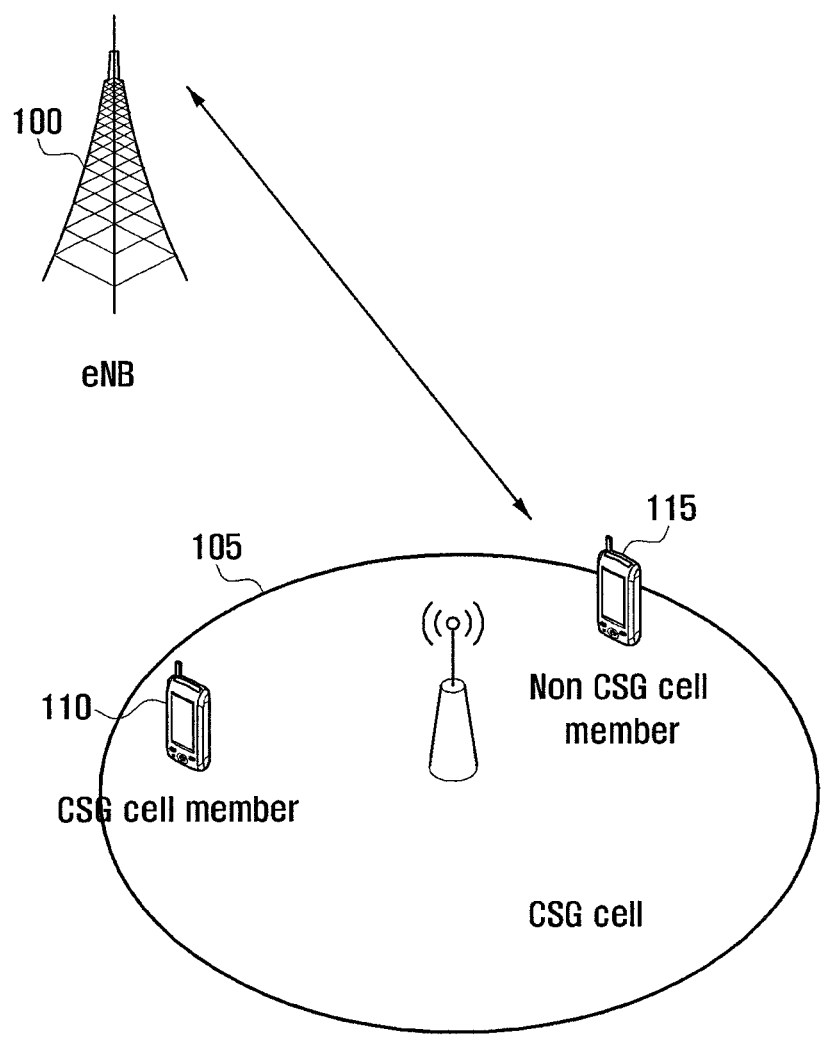
FIG. 1 is a view illustrating a concept of a Closed Subscriber Group (CSG) cell according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method which effectively controls a cell reselection priority of a User Equipment (UE) in a Closed Subscriber Group (CSG) cell and an apparatus thereof.

The term "cell reselection" refers to a process of reselecting a serving cell in order to allow a moving UE to connect with a cell in a best channel state. For example, if one UE receives information about a priority order of two frequencies f1 and f2, and f1 has a higher priority than f2, a probability that the UE remains at f1 is increased. Although, if the UE is at f2, and if a state of f2 is not better than f1, the UE may try to change from f2 to f1. The priority information about frequencies not only broadcast through a System Information Block (SIB), but is also provided through a Radio Resource Control (RRC) connection release message, which is a dedicated RRC signaling (or an upper layer signaling) to a specific UE. Although the UE has already had the priority information about frequencies through the SIB, if the UE receives UE-specific priority information through RRC signaling, the UE may ignore the priority information through the SIB. The priority information about each frequency is transferred through a cell reselection priority (cellReselectionPriority) Information Element (IE), and one of a total of eight (8) stages in a priority order is assigned to it.

It is prohibited to assign the same priority to the frequencies between different Radio Access Technologies (RATs). If the UE is in an idle state of 'camped on any cell state', frequency priority information which is received through an SIB is applied and frequency priority information which is received through RRC signaling is only stored and is not used.

The cell reselection priority (cellReselectionPriority) IE may not exist as an optional IE. In this case, the priority information about a corresponding frequency is not assigned. At this time, the UE regards the priority of the corresponding frequency as the lowest stage.

Figure 2:
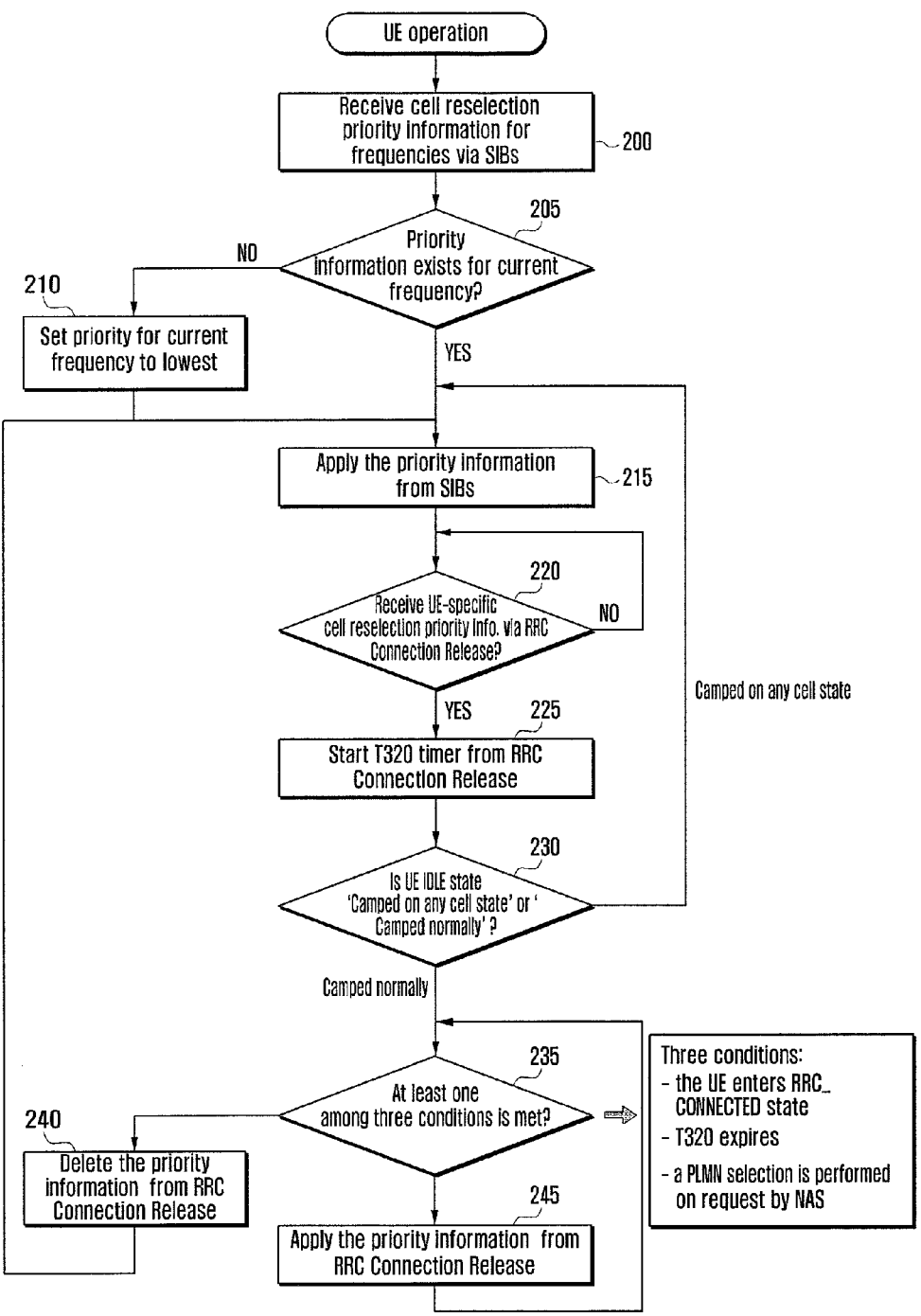
FIG. 2 is a flowchart illustrating a process of broadcasting priority information about each frequency through a System Information Block (SIB), or applying priority information through a Radio Resource Control (RRC) connection release message, which is a dedicated RRC signaling to a User Equipment (UE), according to an exemplary embodiment of the present invention.

FIG. 2 is a flowchart illustrating a process of broadcasting priority information about each frequency through an SIB, or applying the priority information through an RRC connection release message, which is a dedicated RRC signaling to a UE, according to an exemplary embodiment of the present invention.

Referring to FIG. 2, the UE receives priority information about frequencies used in different RATs through an SIB as well as Evolved Universal Mobile Telecommunications System (UMTS) Terrestrial Radio Access Network (EUTRA) in step 200. However, priority information about various frequencies is not necessarily provided. Priority information about a frequency of a serving cell on which the UE is currently camping may also not be provided. The UE determines whether priority information about a frequency of a current serving cell is provided in step 205. If the priority information about the frequency of the current serving cell is not provided, the priority of the frequency is regarded as the lowest stage in step 210. Thereafter the process proceeds to step 215. Also, if the priority information about the frequency of the current serving cell is provided, the process proceeds to step 215.

In step 215, the UE applies the priority information about each frequency. If the UE receives an RRC connection release message, the UE switches from a connected mode to an idle mode. The RRC massage may include priority information about frequencies. As it is UE-specific information, it is applied preferentially over frequency priority information provided from an SIB. Thus, the UE identifies whether the frequency priority information is included in the RRC message in step 220. If the priority information exists, a timer with a T320 value is started in step 225. The T320 value may be included with the priority information. The UE determines whether the current idle mode state is in either 'camped on any cell' state or 'camped normally' state in step 230. The 'camped normally' state is a state where the UE is camping on a suitable cell. As the suitable cell is a cell which can provide a normal service to a UE, the suitable cell satisfies one or more conditions as follows:

Cell corresponding to selected Public Land Mobile Network (PLMN), registered PLMN or PLMN in equivalent PLMN list;
Cell not barred;
Cell of satisfying selection criterion; and
Cell where a corresponding CSG IDentifier (ID) is in a white-list of UE if it is CSG cell.

The 'camped on any cell' state is a state where, since the UE cannot camp on a suitable cell, the UE camps on an acceptable cell. However, it is not possible to receive a normal service in the acceptable cell. Rather, the UE may only try to perform an emergency call. The acceptable cell satisfies one or more conditions as follows:

Cell not barred; and
Cell of satisfying a selection criterion.

If the UE is in an idle state of 'camped on any cell', instead of priority information provided from the RRC connection release message, the UE returns to step 215 and applies the frequency priority information provided from the SIB. If the UE is in an idle state of 'camped normally', the UE determines whether at least one of the three conditions below is satisfied in step 235. The three conditions include:

UE which switches to a connected mode;

T320 timer which is completed; and

PLMN selecting process which is performed according to a Network Domain Security (NDS) request.

If at least one of the above conditions is satisfied, the UE deletes the priority information provided through the RRC connection release message in step 240, returns to the step 215, and applies the frequency priority information provided through the SIB. On the contrary, if at least one of the above conditions is not satisfied, the UE applies the priority information provided through the RRC connection release message in step 245.

The frequency priority information influences a measurement of a specific frequency by the UE. The UE always performs the measurement of the specific frequency having a higher priority than that of a current serving cell.

On the contrary, for reducing power consumption of the UE, a corresponding frequency is not always measured for any other frequency which is of the same frequency (i.e., intra-frequency) as the serving cell or has the same or higher priority. It is determined whether to perform the measurement when a channel Quality of Service (QoS) is not greater than a specific threshold value. Although a cell reselection is performed for moving to an excellent cell in a channel state, there is no longer any reason to move to a frequency which has a lower or the same priority than that of a current serving cell when the channel QoS of the current serving cell is excellent. Thus, for reducing power consumption due to an unnecessary channel measurement, it is determined whether to perform the measurement with reference to the specific threshold value.

In the same frequency (i.e., intra-frequency), when a QoS of the serving cell is equal to or lower than the specific threshold value Sintrasearch, the channel measurement for any other cell of the same frequency is performed. For another frequency which is not greater than the specific threshold value Sintrasearch, when the QoS of the serving cell is equal to or lower than the specific threshold value Sintrasearch, the channel measurement for any other cell of a corresponding frequency is performed. The channel QoS is generally based on at least one of Reference Signal Received Power (RSRP) and Reference Signal Received Quality (RSRQ).

While performing such a measurement, if a channel QoS of a frequency of a cell having a high priority is higher than a specific threshold value ThreshX-high, the UE reselects the cell frequency having the high priority as a serving cell. If a channel QoS of a cell frequency having a low priority is higher than a specific threshold value ThreshX-low and a QoS of the serving cell is lower than a threshold value ThreshServing-low, the UE reselects the cell frequency cell having the low priority as the serving cell. A priority order of each cell of frequencies having the same frequency or priority is determined using a specific formula based on the channel QoS. This process is referred to as cell ranking.

A ranking value of a serving cell is defined as '$Rs=Qmeas,s+Qhyst,s$'. On the contrary, a ranking value of an adjacent cell is defined as '$Rn=Qmeas,n+Qoffs,n$'. $Qmeas,s$ and $Qmeas,n$ are values of RSRP of the serving and adjacent cells, the $Qhyst,s$ is a hysteresis value, and the $Qoffs,n$ is an offset values of the serving and adjacent cells. If the ranking value is high, the corresponding cell is selected as the serving cell.

The CSG cell also uses a specific frequency for providing a service. When the UE camps on the CSG cell as the serving cell, the UE determines how to set a priority of a corresponding cell frequency. Exemplary embodiments of the present invention propose a method of determining a priority of a CSG cell frequency.

Figure 3:
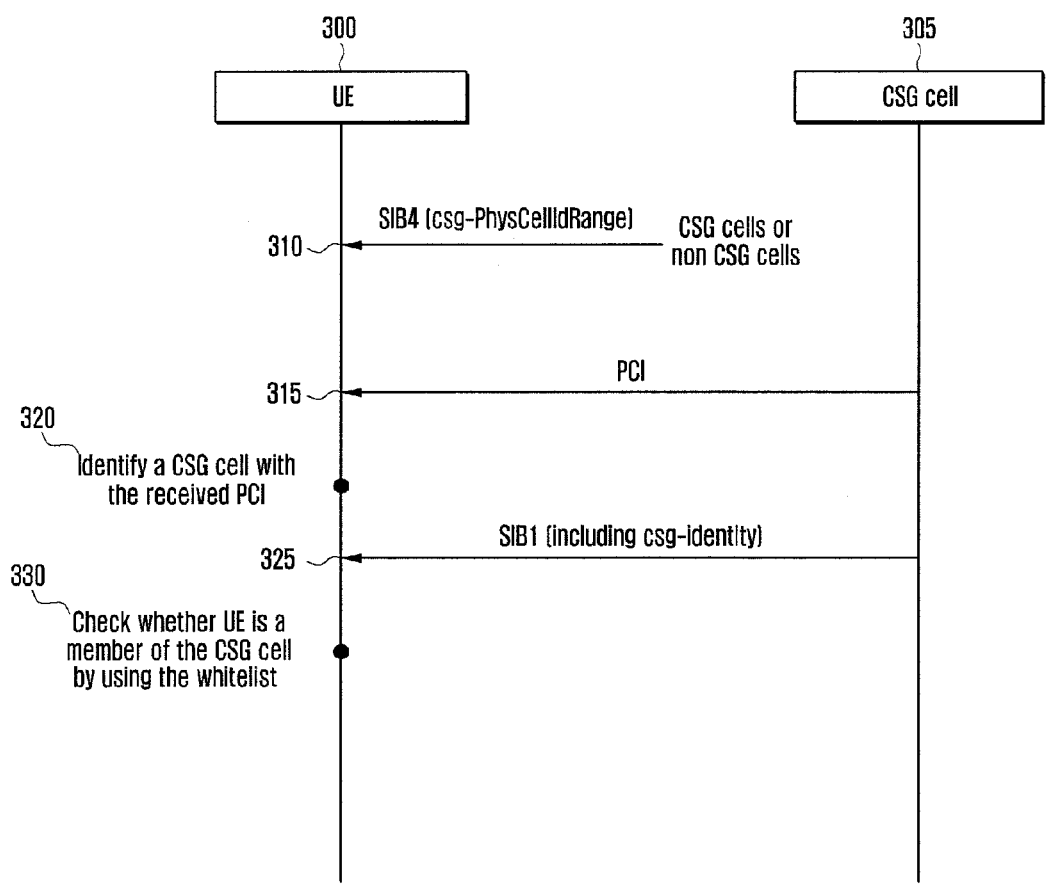
FIG. 3 is a view illustrating a process of allowing a UE, which is a CSG cell member, to recognize an adjacent CSG cell according to an exemplary embodiment of the present invention.

FIG. 3 is a view illustrating a process of allowing a UE, which is a CSG cell member, to recognize an adjacent CSG cell according to an exemplary embodiment of the present invention.

Referring to FIG. 3, the UE 300 receives a range of Physical Cell IDs (PCIs) value which are assigned from a CSG cell or a non-CSG cell to a CSG cell through the SIB in step 310. In the range of the PCIs, a PCI which is assigned to a normal cell is distinguished from a PCI which is assigned to the CSG cell. The UE receives a synchronizing signal of an adjacent CSG cell and obtains a PCI of a corresponding CSG cell from the adjacent CSG cell in step 315. The UE identifies whether the corresponding PCI value is included in the range of PCIs assigned to the CSG cells, and determines whether the corresponding cell is a CSG cell in step 320. The UE identifies an ID of the corresponding CSG cell 305 through a CSG-identity IE included in SIB1 broadcasted from the CSG cell 305 in step 325. A configuration table of a CSG ID IE is shown below: IE ASN1START CSG-Identity::=BIT STRING (SIZE (27))

ASN1STOP, where the CSG ID is used for indicating one CSG cell using a total of 27 bits.

The UE identifies whether the ID of the CSG cell is included in a white-list for the CSG cell which the UE has in step 330. If the ID of the CSG cell is included therein, the UE may camp on the CSG cell.

If the UE camps on the CSG of which the UE is a member, the UE should determine a priority of a current frequency. Exemplary embodiments of the present invention propose a method of determining a priority for a current frequency when the UE camps on a CSG cell and a CSG cell is reselected from another CSG cell.

If the UE camps on a CSG cell, a priority for a cell reselection is changed into the highest stage. As the CSG cell is a cell for providing a service only to limited members, if a UE having a membership is in a service range of the CSG cell, it is preferable to camp on the CSG cell if possible. Further, for reducing a UE power consumption, there is a need for prohibiting an unnecessary channel measurement. Thus, the priority of the current frequency is up-rated to the highest stage if the UE camps on a CSG cell. As described above, frequency priority information about a current serving cell may not be provided. In this case, according to the prior art, a priority of a corresponding frequency is set as the lowest stage. However, according to an exemplary embodiment of the present invention, in a case where priority information about a current frequency is not provided, if the UE camps on a CSG cell, the priority is changed into the highest stage. If the UE performs a reselection from a CSG cell to another cell, the UE determines a reselection from a previous priority to a priority of a current camped frequency according to a priority rule. That is, when the priority information about the current frequency is provided to the UE, if a reselection from a CSG cell to another cell is performed, the UE changes the previous priority from the highest stage to the lowest stage.

Figure 4:
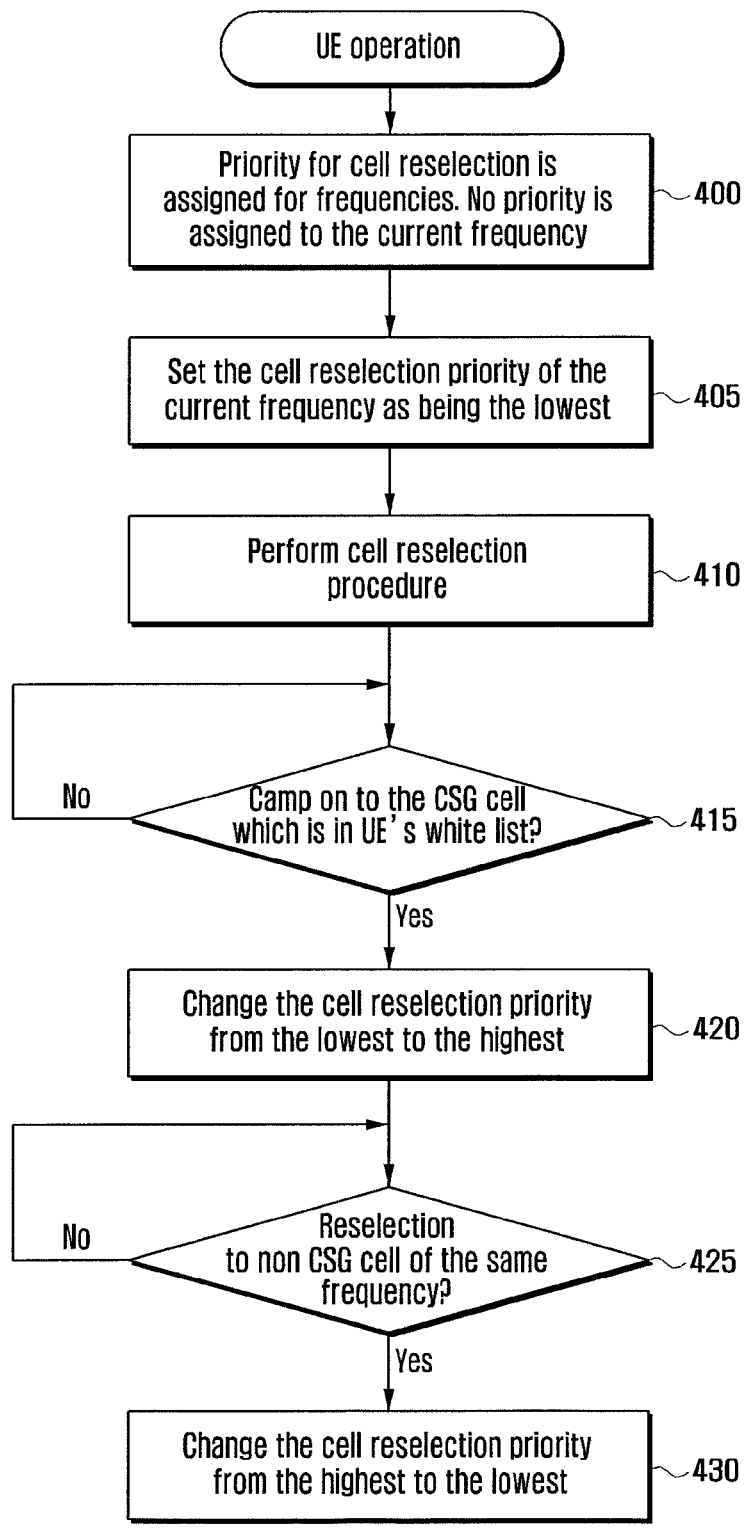
FIG. 4 is a view illustrating a method of determining a cell reselection priority for a CSG cell according to an exemplary embodiment of the present invention.

FIG. 4 is a view illustrating a method of determining a cell reselection priority for a CSG cell according to an exemplary embodiment of the present invention.

Referring to FIG. 4, the UE receives priority information about each frequency in step 400. Here, the priority information may not be provided for all frequencies, and there may not be priority information for a current frequency. If there is no priority information for the current frequency, the UE sets the priority of the current frequency as the lowest stage of the eight (8) stages in step 405.

The UE performs a cell reselection process based on the received priority information in step 410. A corresponding UE may continuously identify whether the UE should camp on a CSG cell included in a white-list which the UE possesses in step 415.

At an arbitrary time point, the UE may detect that the UE has camped on a CSG cell included in a white-list it possesses. Then, although there is no priority information about a current frequency, the UE changes the priority to the highest stage in step 420.

The UE identifies whether the reselection from a CSG cell to another cell is performed in step 425. If the reselection from the CSG cell to the other cell is performed, since there is no priority information about the current frequency, the UE changes the priority of the current frequency to the lowest stage in step 430.

Summarizing the features of the exemplary embodiments of the present invention described above, when the UE determines a cell reselection priority of an arbitrary serving frequency (or current frequency), despite a cell reselection priority of any other frequency other than the serving frequency being provided, the cell reselection priority of the serving frequency is not provided, and the UE changes the priority of the serving frequency into the lowest value. When the UE selects a CSG cell of which the UE is a member in a frequency, the priority of which is changed into the lowest value, the UE changes the priority of the frequency from the lowest value to the highest value in order to maintain a camping-on state in the frequency. After this, if the UE selects any cell other than the CSG cell in the frequency, the UE again changes the priority of the frequency to the lowest value.

To increase a probability of being in a CSG cell formed frequency for itself, the present exemplary embodiment may be modified as follows. If priorities of one frequency or more are provided to the UE, and a priority for only several of the adjacent frequencies which the UE obtains through system information and serving frequencies are provided, the UE assigns the lowest value to the priorities of frequencies (adjacent or serving frequencies), the priorities of which are provided to the UE.

If at an arbitrary time point, for example, by camping on a CSG cell at an arbitrary frequency, the UE recognizes that the arbitrary frequency is a frequency of the CSG cell, the UE sets a cell reselection priority of the frequency into the highest value. Although the UE moves from the CSG cell to any other cell, the UE maintains the set value during a predetermined time period. Further, although an explicit cell reselection priority for the CSG cell frequency is not provided (a cell reselection priority of any other frequency is provided), the priority of the frequency is maintained at not the lowest but the highest value during the predetermined time period. After passing the predetermined time period, the priority is adjusted into the original value for example, the lowest value.

Figure 5:
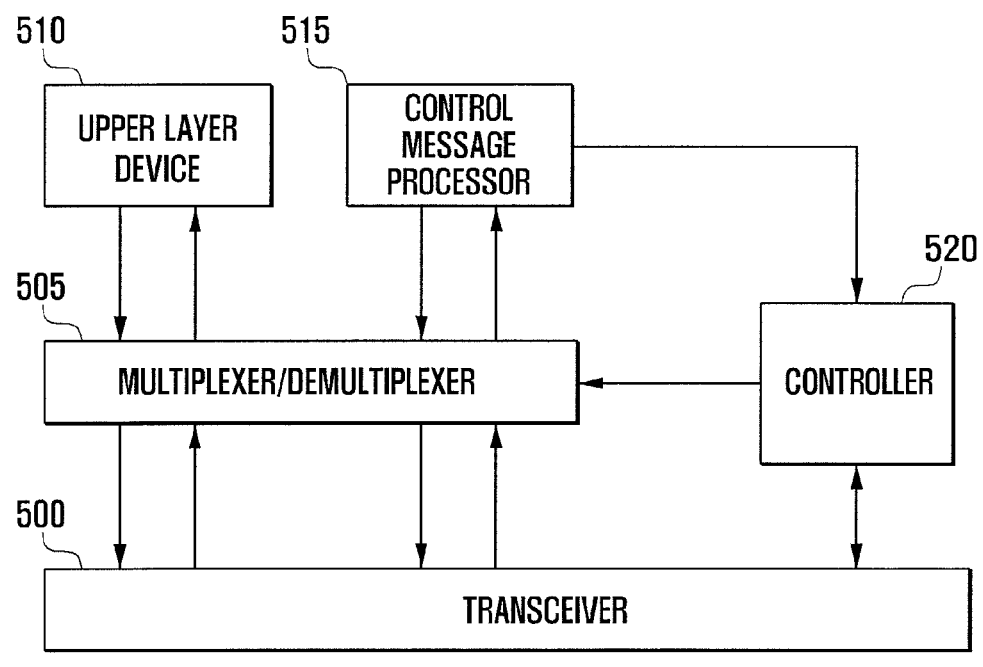
FIG. 5 is a block diagram illustrating an internal configuration of a UE according to an exemplary embodiment of the present invention.

FIG. 5 is a block diagram illustrating an internal structure of a UE according to an exemplary embodiment of the present invention.

Referring to FIG. 5, the UE transmits and receives data and the like to and from an upper layer device 510, and transmits, and receives control messages through a control message processor 515. And, when the UE transmits a control signal or data to a base station, after multiplexing it according to a control of the controller 520, the UE transmits data through a transceiver 500. On the contrary, when receiving, after receiving a physical signal through the transceiver 500 according to a control of the controller 520, the UE demultiplexes a received signal through a multiplexer/demultiplexer 505 and transfers the demultiplexed signal to the upper layer device 510 or the control message processor 515 according to each message.

Meanwhile, according to an exemplary embodiment of the present invention, the controller 520 receives priority information of each frequency about a cell reselection which is transmitted from the base station, and performs a cell reselection process according to the received priority information. Then, the controller 520 determines whether to reselect a CSG cell to which the UE is allowed to access, and controls such that in reselecting the CSG cell, the highest priority for the cell reselection is assigned to a frequency of the CSG cell.

In this case, the priority information may be received through an SIB or an upper layer signaling.

If the priority information may be received through the upper layer signaling, the controller 520 may ignore the priority information received through the SIB.

Meanwhile, when the received priority information does not include priority information about a frequency to which the UE is currently connected, the controller 520 may control such that the lowest priority for the cell reselection is assigned to the frequency to which the UE is currently connected.

According to an exemplary embodiment of the present invention, if the UE is in a state of not camping on a cell which may provide a normal service to the UE, the controller 520 may control such that the cell reselection process is performed according to the priority information received through the SIB.

According to another exemplary embodiment of the present invention, when the controller 520 reselects another cell except for the CSG cell, the controller 520 may assign the lowest priority for the cell reselection to the frequency of the CSG cell.

Further, according to yet another exemplary embodiment of the present invention, when the controller 520 reselects another cell except for the CSG cell, the controller 520 may control such that the highest priority for the cell reselection assigned to the frequency of the CSG cell is maintained during a predetermined time period. According to the exemplary embodiments of the present invention described above, the UE which performs the CSG cell reselection can increase the probability of maintaining the state of camping on the CSG cell.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of reselecting a cell by a user equipment (UE) in a mobile communication system, the method comprising:
   receiving a first message including first priority information for cell reselection;
   if second priority information is included in a second message, ignoring the first priority information provided in the first message;

while the UE is camped on a suitable closed subscriber group (CSG) cell, considering a current frequency to be a highest priority frequency for cell reselection irrespective of the first priority information and the second priority information; and deleting the second priority information provided by the second message if the UE enters radio resource control connected (RRC_CONNECTED) state, or if a timer expires, or a public land mobile network (PLMN) selection is performed on request by non-access stratum (NAS).

2. The method of claim 1, further comprising:
if the UE is in an any cell state, applying the first priority information provided by the first message,
wherein the any cell state indicates that the UE camps on any cell.

3. The method of claim 1, further comprising:
if the UE is in a camped normally state and has only the second priority information provided by the second message, considering the current frequency to be a lowest priority frequency.

4. The method of claim 1, further comprising:
if reselecting another cell except for the CSG cell, assigning a lowest cell reselection priority to a frequency for the CSG cell.

5. A user equipment (UE) for reselecting a cell in a mobile communication system, the UE comprising:
a transceiver configured to control for transmitting and receiving a signal or data to and from a base station; and a processor configured to:
control for receiving a first message including first priority information for cell reselection,
control for ignoring the first priority information provided in the first message if second priority information is included in a second message, and
while the UE is camped on a suitable Closed Subscriber Group (CSG) cell, consider a current frequency to be a highest priority frequency for cell reselection irrespective of the first priority information and the second priority information,
wherein the processor is configured to control to delete the second priority information provided by the second message if the UE enters a radio resource control connected (RRC_CONNECTED) state, or if a timer expires, or a public land mobile network (PLMN) selection is performed on request by non-access stratum (NAS).

6. The UE of claim 5, wherein the processor is configured to control for applying the first priority information provided by the first message if the UE is in an any cell state, and
wherein the any cell state indicates that the UE camps on any cell.

7. The UE of claim 5, wherein the processor is configured to control for considering the current frequency to be a lowest priority frequency if the UE is in a camped normally state and has only the second priority information provided by the second message.

8. The UE of claim 5, wherein the processor is configured to control for assigning a lowest cell reselection priority to a frequency for the CSG cell if reselecting another cell except for the CSG cell.

* * * * *